UNITED STATES PATENT OFFICE.

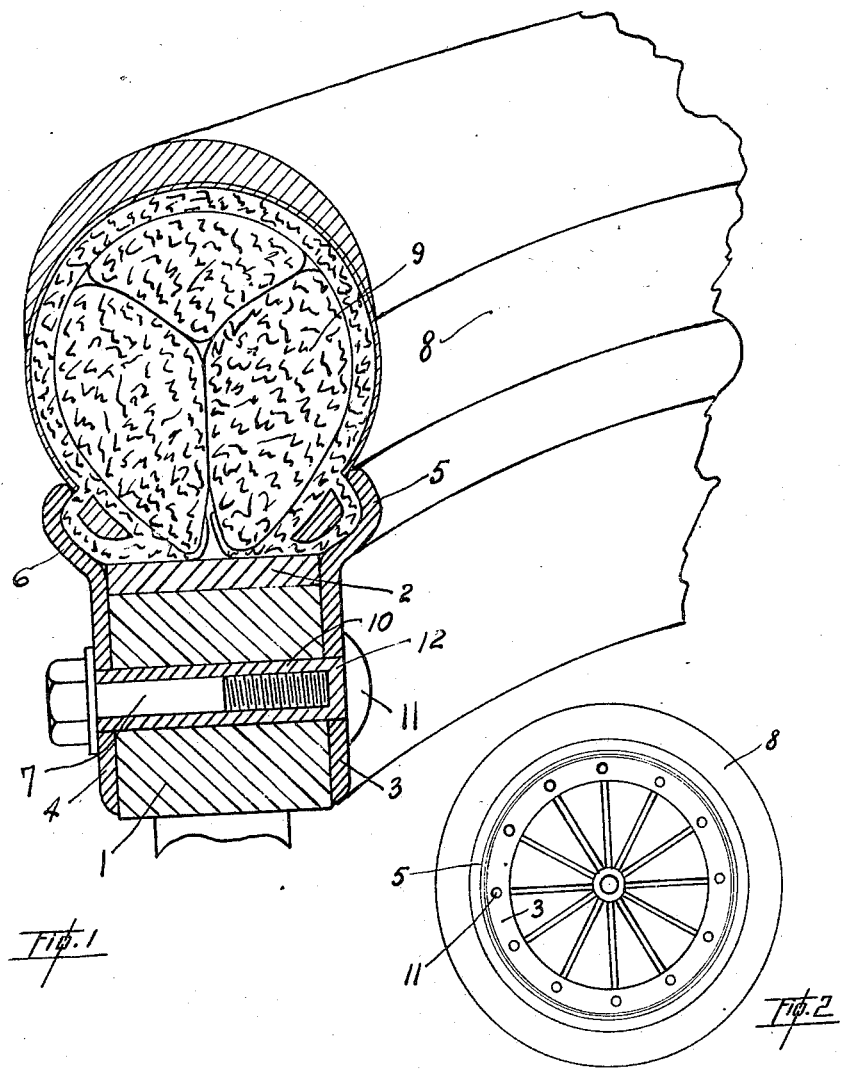

THOMAS WILLIAM COSTELLO, OF SAN FRANCISCO, CALIFORNIA.

TIRE RIM FOR USE ON AUTOTRUCKS AND OTHER VEHICLES.

1,410,892.

Specification of Letters Patent. Patented Mar. 28, 1922.

Application filed July 24, 1919. Serial No. 313,046.

*To all whom it may concern:*

Be it known that I, THOMAS WILLIAM COSTELLO, a citizen of the United States, and a resident of the city of San Francisco, in the State of California, United States of America, have invented certain new and useful Improvements in Tire Rims for Use on Autotrucks and other Vehicles, of which the following is a specification.
This invention relates to improvements in that type of metal wheel rims generally known as clincher rims used on auto-trucks or other vehicles of like character which are equipped with clincher tires made of rubber and cord or fabric tire casings containing fillers such as elastic sponge rubber or the like. This invention essentially consists of a combination of (1) wheel felly, (2) of encircling band therefor on which the tire is seated, and (3) of removable clinch rim members extending around the felly on each side thereof, said members being detachably connected one to the other by the co-operation of internally threaded steel bushings and of externally threaded screw bolts.

The object of my invention is to provide a simple and effective means the use of which enables such tires containing rubber fillers or the like to be put in place very easily and expeditiously by the application of equal pressure and leverage all round the metal rim. In effect, the object is to provide a separable clincher rim which allows the rubber and cord or fabric tire casing with its filler to be assembled thereon through the principle of external contraction, or removed therefrom with greater ease and convenience and in less time than is possible with the methods in present use.
I attain this object by the construction illustrated in the accompanying drawings in which—

Fig. 1 is a fragmentary perspective view showing the practical application of the invention.

Fig. 2 is a view to a reduced scale of an auto-truck wheel with which the invention is embodied.

Similar figures of reference indicate similar parts throughout the views.

1 indicates the wooden felly of an auto-truck wheel, girdled with the metal band 2, these parts being similar to those found in auto-trucks at the present time. 3 and 4 indicate plates adapted to lie on the sides of the wood felly and extending around the same on each side of it, the upper ends of the plates extending above the metal band 2 and being of clinch formation, as indicated at 5 and 6 from which it will be seen that a clincher rim is formed consisting of the metal band 2 and the side clinch members 5 and 6, which members 5 and 6 are held rigidly together by screws 7 threaded into internally threaded steel bushings 10 passed through the plates 3 and 4 and through the wood felly 1 as well, these bushings being spaced equidistant around the felly and provided with a snap head 11 and being squared adjacent their heads as at 12 to keep them from revolving when in place and the screws 7 are being tightened up. In other words, a separable clincher rim is formed the clinches of which are detachable and may be separated one from the other when required.

8 indicates the tire casing filled, as indicated, with an elastic sponge rubber core 9.

The manner in which the invention is used will be obvious, on reference being had to Fig. 1, as it will be seen that to remove the casing and filler all that is necessary is to remove the side plate 3 or 4, as the case may be, when the casing may be readily pulled off. The replacing of the casing and filler is effected with equal facility, as, the side plate being off, the casing and filler are easily placed around the band 2, being then, of course, in an expanded condition, when by replacing the side plate and tightening up the screws 7 equally all round so as to exert an equal pressure acting externally on the tire casing bead, the same is pressed into place and securely held in the clinches 5 and 6.
It will thus be seen that I have devised a separable clincher rim for use on wheels of auto-trucks and vehicles of like character which is of great convenience and utility, and is particularly adapted to the specific purpose of mounting and demounting tire casings containing elastic sponge rubber fillers or the like, which said tires require to be mounted on rims under lateral pressure through force exerted under the principle of external contraction.

What I claim as my invention is—

In a pressure rim for vehicle wheels, the combination with a wheel felly, of a pair of clamping rings extending around the felly on opposite sides thereof and adapted to engage and force together the beads of a tire casing mounted on the felly between the rings, and means for forcing said rings together including a plurality of hollow internally threaded bushings extending through the wheel felly and through both of said rings and provided at one end with heads adapted for clamping engagement with one of the rings, the portion of the bushings adjacent said heads being squared to hold the bushings from rotating, and a plurality of bolts adapted to be threadedly engaged in said bushings for clamping engagement with the opposite ring, said bolts having headed ends bearing against the last-mentioned rings.

Dated at San Francisco, California, this 17th day of June, 1919.

THOMAS WILLIAM COSTELLO.